United States Patent
Ansari et al.

(10) Patent No.: US 9,253,719 B2
(45) Date of Patent: Feb. 2, 2016

(54) ASSOCIATION THROUGH GREEN ENERGY AND LATENCY AWARENESS IN WIRELESS NETWORKS

(71) Applicant: New Jersey Institute of Technology, Newark, NJ (US)

(72) Inventors: Nirwan Ansari, Montville, NJ (US); Tao Han, North Arlington, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 35 days.

(21) Appl. No.: 14/364,656

(22) PCT Filed: Dec. 3, 2013

(86) PCT No.: PCT/US2013/072828
§ 371 (c)(1),
(2) Date: Jun. 11, 2014

(87) PCT Pub. No.: WO2015/084330
PCT Pub. Date: Jun. 11, 2015

(65) Prior Publication Data
US 2015/0223159 A1    Aug. 6, 2015

(51) Int. Cl.
*H04W 48/20* (2009.01)
*H04W 52/02* (2009.01)
*H04W 16/04* (2009.01)
(Continued)

(52) U.S. Cl.
CPC .............. *H04W 48/20* (2013.01); *H04W 16/04* (2013.01); *H04W 24/08* (2013.01); *H04W 48/10* (2013.01); *H04W 52/0206* (2013.01)

(58) Field of Classification Search
CPC ..... H04W 48/20; H04W 24/08; H04W 48/10; H04W 16/04
USPC .......... 455/435.2, 435.3, 522, 525, 3.04, 572, 455/574, 127.1, 127.5, 343.1
See application file for complete search history.

(56) References Cited

U.S. PATENT DOCUMENTS

| 8,543,116 B2 | 9/2013 | Zhang et al. |
| 2006/0128313 A1 | 6/2006 | Chang |
| 2008/0025339 A1* | 1/2008 | Le ............................ H04W 4/08 370/445 |

(Continued)

FOREIGN PATENT DOCUMENTS

| WO | 2013006102 A1 | 1/2013 |
| WO | 2012019556 A1 | 2/2013 |

OTHER PUBLICATIONS

"Sustainable energy use in mobile communications," Ericson Inc., white Paper, pp. 1-23 (Aug. 2007).

(Continued)

*Primary Examiner* — Cong Tran
(74) *Attorney, Agent, or Firm* — Turk IP Law, LLC (57) ABSTRACT

Technologies are generally described to provide a distributed scheme that enables a Green-energy Aware and the Latency Aware (GALA) user-base station (BS) associations in wireless networks, whose BSs are powered by both on-grid energy and green energy. According to some examples, the GALA approach may consider traffic delivery latency and green energy generation rate in BSs to determine the user-BS association. The GALA approach may converge to a particular solution, which may reduce the summation of the weighted latency ratios of BSs, while enabling a trade-off between the on-grid power consumption and the average traffic delivery latency.

24 Claims, 6 Drawing Sheets

(51) Int. Cl.
*H04W 24/08* (2009.01)
*H04W 48/10* (2009.01)

(56) References Cited

U.S. PATENT DOCUMENTS

| | | | | |
|---|---|---|---|---|
| 2009/0303888 | A1* | 12/2009 | Ariyur | H04L 41/0816 370/252 |
| 2010/0142458 | A1* | 6/2010 | Mark | H04W 52/143 370/329 |
| 2012/0252525 | A1 | 10/2012 | Frenger et al. | |
| 2012/0307700 | A1 | 12/2012 | Nordberg et al. | |
| 2014/0371941 | A1* | 12/2014 | Keller | G05F 1/66 700/297 |

OTHER PUBLICATIONS

Arnold, O., "Power consumption modeling of different base station types in heterogeneous cellular networks," IEEE Future Network and Mobile Summit, pp. 1-8 (2010).
Bolla, R., et al., "Energy Efficiency in the Future Internet: A Survey of Existing Approaches and Trends in Energy-Aware Fixed Network Infrastructures," IEEE Communications Surveys & Tutorials, vol. 13, Issue 2, pp. 223-244 (2011).
Chen, Y., "Fundamental Tradeoffs on Green Wireless Networks," IEEE Communications Magazine, vol. 49, Issue 6, pp. 1-17, Jan. 2011.
Correia, L. ., et al., "Challenges and enabling technologies for energy aware mobile radio networks," IEEE Communications Magazine, vol. 48, Issue 11, pp. 66-72 (2010).
Corroy, S., et al., "Dynamic cell association for downlink sum rate maximization in multi-cell heterogeneous networks," IEEE International Conference on Communications (ICC), pp. 2486-2489 (2012).
De Brito, G.S "Evolution of land mobile radio (including personal) communications: Cost 231." 2nd International Conference on Universal Personal Communications, 1993. Personal Communications: Gateway to the 21st Century. Conference Record., vol. 2, pp. 560-564, Oct. 1993.
Etoh, M., et al., "Energy consumption issues on mobile network systems," International Symposium on Applications and the Internet, pp. 365-368, Jul. 2008.
Goiri, I., et al., "Greenhadoop: Leveraging Green Energy in Data-Processing Frameworks," Proceedings of the 7th ACM European conference on Computer Systems, pp. 57-70 (2012).
Han T., and Ansari, N., "On Optimizing Green Energy Utilization for Cellular Networks with Hybrid Energy Supplies," IEEE Transactions on Wireless Communications, vol. 12, Issue 8, pp. 3872-3882 (2013).
Han, T., and Ansari, N., "ICE: Intelligent Cell BrEathing to Optimize the Utilization of Green Energy," IEEE Communications Letters, vol. 16, No. 6, pp. 866-869 Jun. 2012.
Han, T., and Ansari, N., "On greening cellular networks via multicell cooperation," IEEE Wireless Communications Magazine, vol. 20, Issue 1, pp. 82-89 (2013).
Han, T., and Ansari, N., "Optimizing Cell Size for Energy Saving in Cellular Networks with Hybrid Energy Supplies," IEEE Wireless Networking Symposium, pp. 5411-5415 (2012).
Jo, H.-S., et al., "Heterogeneous cellular networks with flexible cell association: A comprehensive downlink SINR analysis," IEEE Transactions on Wireless Communications, vol. 11, Issue 10, pp. 3484-3495 (2012).
Kim, H., et al., "Distributed α—optimal user association and cell load balancing in wireless networks," IEEE/ACM Transactions on Networking, vol. 20, Issue 1, pp. 177-190 (2012).
Krioukov, A., et al., "Design and evaluation of an energy agile computing cluster," EECS Department, University of California, pp. 1-12 (2012).
Pantos, R., "HTTP Live Streaming draft-pantos-http-live-streaming-06," Apple Inc., pp. 1-24 (2011).
Son, K., et al., "Toward Energy-Efficient Operation of Base Stations in Cellular Wireless Networks," Chapter 16, Green Communications Algorithms and Applications, pp. 435-474 (2012).
Son, K., et al., "Base Station Operation and User Association Mechanisms for Energy-Delay Tradeoffs in Green Cellular Networks," IEEE Journal on Selected Areas in Communications, vol. 29, No. 8, pp. 1525-1536, Sep. 2011.
Zhou, J., et al., "Energy source aware target cell selection and coverage optimization for power saving in cellular networks," EEE/ACM Int'l Conference on Green Computing and Communications & Int'l Conference on Cyber, Physical and Social Computing, Green Computing and Communications, pp. 1-8, Dec. 2010.
International Search Report and Written Opinion for International Application No. PCT/US2013/072828 mailed of Feb. 27, 2014.
Han et al., "Green-Energy Aware and Latency Aware User Associations in Heterogeneous Cellular Networks", pp. 1-6.

* cited by examiner

ASSOCIATION THROUGH GREEN ENERGY AND LATENCY AWARENESS IN WIRELESS NETWORKS

STATEMENT REGARDING FEDERALLY SPONSORED RESEARCH OR DEVELOPMENT

This invention was made with government support under grants CNS1147502 and CNS1218181 awarded by the National Science Foundation. The government has certain rights in the invention.

This Application is the National Stage filing under 35 U.S.C. §371 of PCT Application Ser. No. PCT/US2013/072828 filed on Dec. 3, 2013. The PCT Application is herein incorporated by reference in its entirety.

CROSS-REFERENCE TO RELATED APPLICATION

BACKGROUND

Unless otherwise indicated herein, the materials described in this section are not prior art to the claims in this application and are not admitted to be prior art by inclusion in this section.

Reduction of energy consumption may be one of the goals in wireless network design and deployment. For example, heterogeneous cellular networks may optimize network deployment by taking advantage of the heterogeneity of the next generation cellular networks, while attempting to reduce the energy consumption of cellular networks. A network deployment featuring high density deployments of small, low power base stations may achieve higher network energy efficiency than a sparse deployment of few high power base stations. Heterogeneous network deployment may increase network efficiency because it may employ high density and low power base stations. In some scenarios, up to 50 percent reduction of the total base station (BS) power consumption may be achieved, for example.

One of the challenges in heterogeneous cellular networks is to properly associate mobile users with the serving BSs, referred to as the user-BS association computation. This computation may face two challenges: (1) because the coverage area of macro and pico BSs are overlapped, an inefficient user-BS association may result in an extensive interference to the users located at the cell edges of the pico cell, thereby reducing the spectrum efficiency of the cellular network; and (2) given the available bandwidth on both the macro and pico BSs, an inefficient user-BS association may result in either the macro or the pico BSs experiencing heavy traffic congestion. Therefore, the inefficient or incorrect user-BS association may result in underutilization or inefficient use of the available spectrum, and impair the performance of cellular networks.

SUMMARY

The present disclosure generally describes methods, apparatus, systems, devices, and/or computer program products related to an association through green energy and latency awareness in a wireless network, such as a heterogeneous cellular network.

According to some examples, a method is provided to associate a base station with a communication device through a green energy aware and a latency aware (GALA) approach in a wireless network. The example method may include receiving one or more metrics associated with two or more base stations, where the one or more metrics include a traffic load, an energy latency coefficient, and a green traffic load associated with each base station; analyzing a green energy usage status and a latency status of the two or more base stations based on the one or more metrics; and enabling advertising of the green energy usage status and the latency status of the two or more base stations to the communication device. The method may also include detecting a selection of one of the two or more base stations by the communication device and updating a coverage area of the selected base station based on the selection.

According to other examples, an apparatus including a communication module and a processor is provided to employ a green energy aware and a latency aware (GALA) approach in a wireless network. The communication module may be configured to communicate with at least two or more base stations. The processor may be configured to analyze one or more metrics associated with the two or more base stations, where the one or more metrics include a traffic load, an energy latency coefficient, and a green traffic load associated with each base station; analyze a green energy usage status and a latency status of the two or more base stations based on the one or more metrics; and control the communication module to advertise the green energy usage status and the latency status of the two or more base stations to a communication device. The processor may be further configured to detect a selection of one of the two or more base stations by the communication device and update a coverage area of the selected base station based on the selection.

According to further examples, a system that includes two or more base stations and a controller is provided. The controller may associate one of the two or more base stations with one of a plurality of communication devices through a green energy aware and a latency aware (GALA) approach. The controller may be configured to analyze a green energy usage status and a latency status of the two or more base stations based on one or more metrics associated with the two or more base stations, where the one or more metrics include a traffic load, an energy latency coefficient, and a green traffic load associated with each base station; compute an index for each base station based on the analysis; and order the two or more base stations based on the index. The controller may also be configured to enable advertisement of the ordered base stations to the plurality of communication devices and detect a selection of one of the ordered base stations by the one of the plurality of communication devices.

According to some examples, a computer-readable non-transitory storage medium with instructions stored thereon to associate a base station with a communication device through a green energy aware and a latency aware (GALA) approach in a wireless communication network is provided. The instructions, in response to execution by a processor, may cause the method as described herein to be performed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to association of a base station with a communication device through a GALA approach in a wireless network, such as a heterogeneous cellular network.

Briefly stated, a distributed scheme is described to enable the Green-energy Aware and the Latency Aware (GALA) user-base station (BS) associations in wireless networks, whose BSs are powered by both on-grid energy and green energy. According to some examples, the GALA approach may consider traffic delivery latency and green energy generation rate in BSs for determining the user-BS association. The GALA approach may converge to a particular solution, which may reduce the summation of the weighted latency ratios of BSs, while enabling a trade-off between the on-grid power consumption and the average traffic delivery latency.

Figure 1:
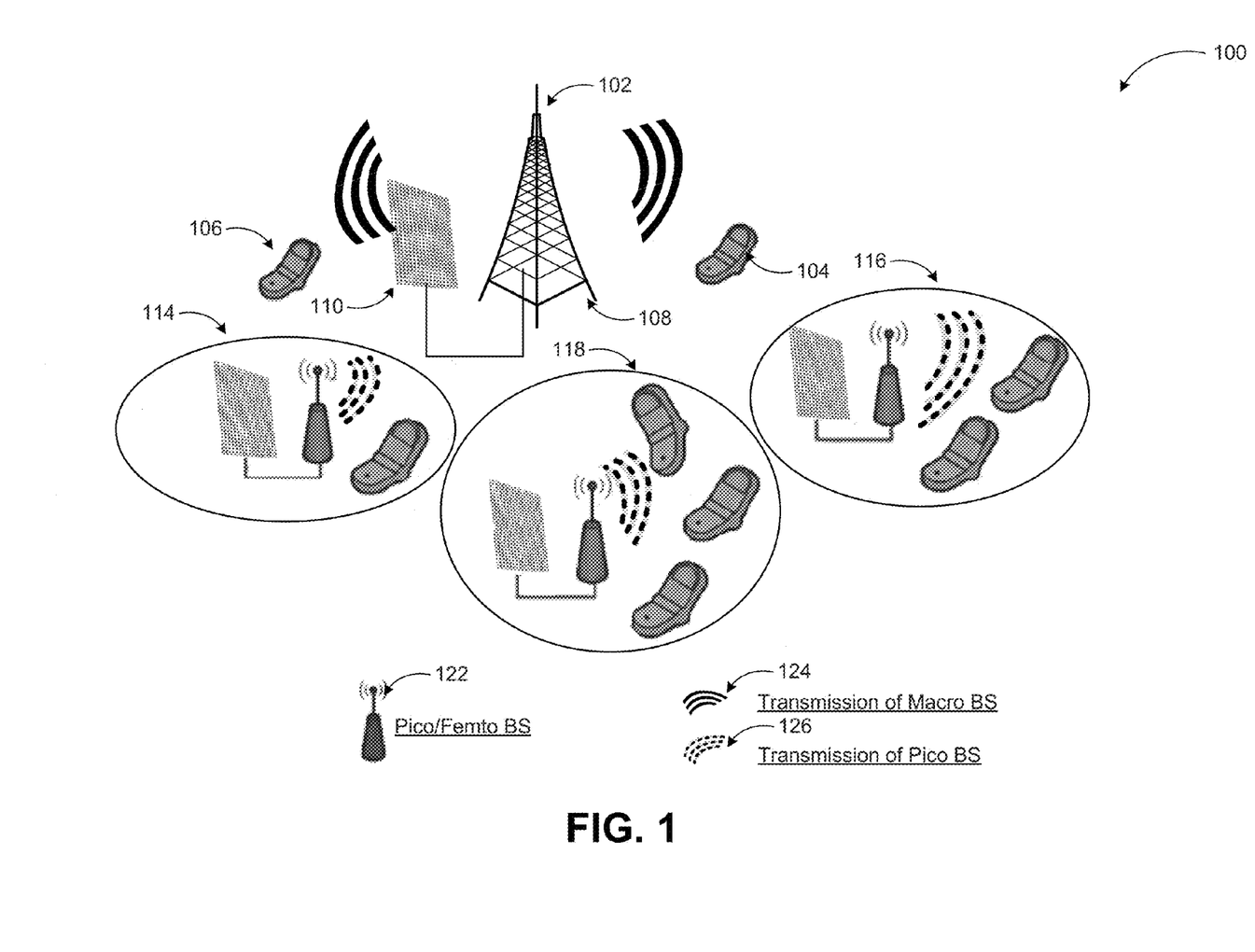
FIG. 1 illustrates an example schema to associate a base station and a communication device through a green energy and latency aware (GALA) approach in a wireless network, such as a heterogeneous cellular network.

FIG. 1 illustrates an example schema to associate a base station and a communication device through a green energy and latency aware (GALA) approach in a wireless network, such as a heterogeneous cellular network, arranged in accordance with at least some embodiments described herein.

Owing to the direct impact of greenhouse gases on the earth environment and the climate change, the energy consumption of Information and Communications Technology (ICT) is becoming an environmental issue and thus a social and economic issue. Wireless networks, such as cellular networks, may be among the major energy consumers of communication networks, and their contributions to the global energy consumption may increase rapidly. Heterogeneous cellular networks, which optimize or otherwise improve network deployment by taking advantage of the heterogeneity of the next generation cellular networks, may reduce energy consumption of cellular networks. Networks with high-density deployments of small, low power BSs may achieve higher network energy efficiency than that of the sparse deployment of few high power BSs.

As green energy technologies advance, green energy such as sustainable biofuels, solar and wind energy may be utilized to power BSs. Other environmentally friendly green energy sources (including renewable energy sources) may be alternatively or additionally used, such as tidal/wave energy, geothermal energy, environmentally friendly/friendlier batteries, and/or others or combination thereof. For purposes of simplification and brevity, solar energy will typically be described herein as an example of the green energy source for the various embodiments. By adopting green energy powered BSs, mobile service providers may further save on-grid power consumption and thus reduce their $CO_2$ emissions. However, because the green energy generation is not stable, green energy may not be a reliable energy source for heterogeneous cellular networks. Therefore, future cellular networks may adopt hybrid energy supplies: on-grid power and green energy. Green energy may be utilized to reduce the on-grid power consumption and thus reduce the $CO_2$ emissions while on-grid power may be utilized as a backup power source.

In heterogeneous cellular networks with hybrid energy supplies, one of the challenges may be to properly associate mobile users with the serving BSs. On the one hand, the transmission power of pico BSs (PBSs) may be substantially lower than that of macro BSs (MBSs) in heterogeneous cellular networks. A pico-cell typically refers to a small cellular coverage area served by a base station, such as in-building (offices, shopping malls, train stations, stock exchanges, etc.), or more recently in aircraft. In cellular networks, pico-cells are typically used to extend coverage to indoor areas, where outdoor signals may not reach well, or to add network capacity in areas with very dense phone usage, such as train stations. Pico-cells provide coverage and capacity in areas difficult or expensive to reach using the more traditional macro-cell approach. In some cases, a base station serving a small coverage area may also provide some of the functionality of a base station controller and/or a mobile switching center. This form of pico-cell may sometimes be called a femto-cell. In such examples, the base station may include the capability to connect directly to the Internet, without the need for the base station controller and mobile switching center infrastructure providing potentially a more cost-effective approach. The MBS may have much higher transmit power than PBSs. Thus, even if mobile users are much closer to PBSs than to the MBS, the users may still receive a stronger downlink pilot signal from the MBS. If mobile users are associated with the BS from which they receive the strongest downlink pilot signal, a majority of the users may be associated with the MBS. As a result, PBSs may be lightly loaded, and may not contribute much on offloading traffic and enhancing the energy efficiency of cellular networks. On the other hand, in heterogeneous cellular networks, the power consumption of MBSs may be substantially larger than that of PBSs. Therefore, associating the users with PBSs may lead to lower power consumption. As a result, the user-BS association schemes that only consider BSs' power consumption may tend to associate as many users with PBSs as possible and lead to heavy traffic congestion in PBSs and degrade the network quality of service (QoS). A distributed user-BS association scheme referred to as Green-energy Aware and Latency Aware (GALA) according to some embodiments may provide user-BS associations for downlink traffic in heterogeneous cellular networks. The GALA approach may not only increase the utilization of green energy in order to reduce the on-grid power consumption of the heterogeneous cellular network, but also reduce the traffic delivery latency of the network to enhance the network QoS.

As depicted, a diagram 100 shows an example heterogeneous cellular network structure with three example pico- or femto-cells. The cellular network structure may include an MBS 102 (for example, constructed on a tower 108) in wireless communication (124) with communication devices 104 and 106 directly. The MBS 102 may also enable wireless (cellular) communication for a number of other communication devices (for example, cellular phones) through base stations in individual pico- or femto-cells 114, 116, and 118. Each of the pico- or femto-cells may have a pico- or femto-BS 122 (also referred to as PBS) in wireless communication (126) with the communication devices in their respective cells. The MBS 102 may be powered by on-grid energy as well as a green energy source such as solar power source 110. Each of the PBSs 122 may also be powered by a green energy source as depicted in the diagram 100. The wireless communications may involve audio, video, and data communications.

MBSs and PBSs may be deployed to provide data communications to an area. Denoting B as the set of BSs. The traffic may be assumed to arrive according to a Poisson process with the arrival rate per unit area at location x equaling to $\lambda(x)$, and the traffic loads may have a general distribution with average traffic load of $v(x)$. Assuming a mobile user at location x is associated with BS j, then the user's data rate $r_j(x)$ may be generally expressed as a logarithmic function of the perceived signal to interference plus noise ratio, $SINR_{i,j}$:

$$r_j(x) = \log_2(1 + SINR_j(x)). \quad [1]$$

The signal to interference plus noise ratio may be defined as:

$$SINR_j(x) = \frac{P_j g_j(x)}{\sigma^2 + \sum_{k \in B, k \neq j} P_k g_k(x)}. \quad [2]$$

Here, $P_j$ is the transmission power of BS j, and $\sigma^2$ denotes the noise power level. $g_j(x)$ may be the channel gain between the user at location x and the jth BS.

The average traffic load density at location x on BS j may then be defined as:

$$\tilde{n}_j(x) = \frac{\lambda(x) v(x) \eta_j(x)}{r_j(x)}, \quad [3]$$

where $\eta_j(x)$ is an indicator function. If $\eta_j(x)=1$, then the user at location x is associated with BS j; otherwise, the user is not associated with BS j. Assuming mobile users are uniformly distributed in the area and denoting A as the coverage area of all the BSs, the traffic load on BS j may be expressed as:

$$\rho_j = \int_{x \in A} \tilde{n}_j(x) dx. \quad [4]$$

The value of $\rho_j$ may indicate the fraction of time BS j is busy.

In an example wireless network, both the MBS and PBSs may have their own solar panels (or other renewable energy source) for generating or otherwise providing green energy. Therefore, the BSs may be powered by hybrid energy sources: on-grid energy and green energy. If green energy generated by solar power is not sufficient, the BSs may consume on-grid energy (and/or perhaps may obtain energy from some other green energy source). Because the MBS usually consumes more energy than PBSs, an assumption may be made that the MBS is equipped with a solar panel (and/or with some other device usable to provide other type of green energy), which has a higher energy generation rate than that of PBSs'.

The BS's power consumption may include two parts: the static power consumption and the dynamic power consumption. The static power consumption may be the power consumption of a BS without any traffic load. The dynamic power consumption may refer to the additional power consumption caused by traffic load on the BS, which may be well approximated by a linear function of the traffic load. Denoting $p_j^s$ as the static power consumption of BS j, BS j's power consumption may be expressed as:

$$p_j = \beta_j \rho_j + p_j^s. \quad [5]$$

Here, $\beta_j$ may be a linear coefficient, which reflects the relationship between the traffic load and the dynamic power consumption in BS j. Denoting $e_j(k)$ as the energy generation rate in BS j during the kth time slot, the on-grid power consumption in BS j during the kth time slot may be expressed as:

$$p_j^o(k) = \max(p_j - e_j(k), 0). \quad [6]$$

Figure 2:
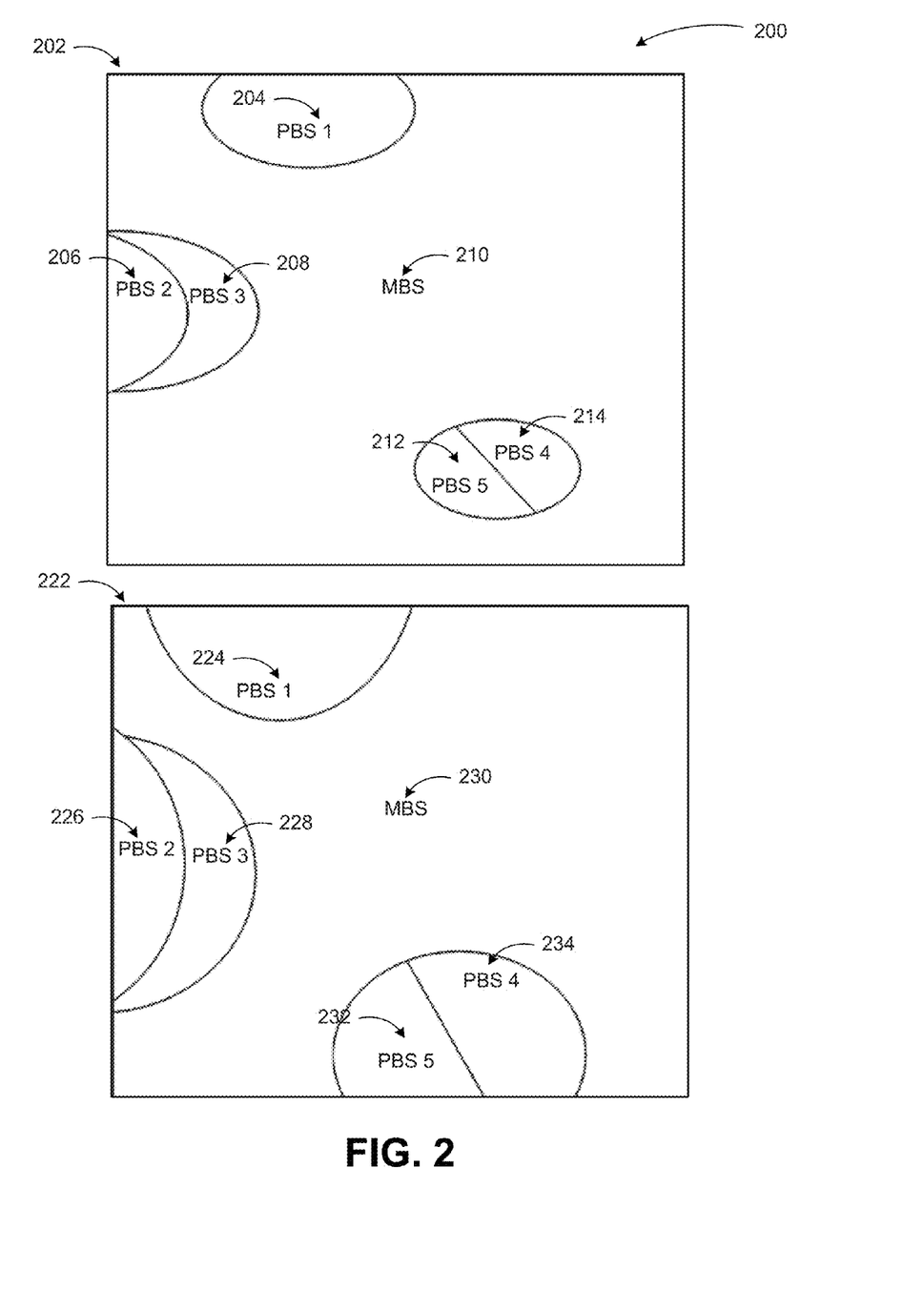
FIG. 2 illustrates an example of a maximum rate approach and an α-optimal distributed approach used to associate a base station with a communication device.

FIG. 2 illustrates an example of a maximum rate approach and an $\alpha$-optimal distributed approach used to associate a base station with a communication device, arranged in accordance with at least some embodiments described herein.

Small cell BSs, such as pico BSs and femto BSs may be powered by green energy in wireless networks. Design of a user-BS association scheme to optimize or otherwise improve the utilization of green energy, as well enhancing the QoS of the users in the heterogeneous cellular networks, may be challenging. For example, in heterogeneous cellular networks, the power consumption of macro BSs (MBSs) may be substantially larger than that of pico BSs (PBSs). Therefore, although the mobile users may receive a stronger downlink pilot signal from MBSs, associating the users with PBSs may result in a lower power consumption. As a result, the user-BS association schemes, which consider the BSs' power consumption may tend to associate as many users with PBSs as possible, thus leading to a heavy traffic congestion in PBSs.

Diagram 200 shows two example coverage diagrams of schemes that may be compared to a GALA approach according to some example embodiments. Maximum rate scheme refers to the users' selecting BSs based on their data rates, which may be determined by the users' perceived SINRs. Coverage diagram 202 shows circular and partially circular coverage areas 204, 206, 208, 214, and 212 of PBSs 1, 2, 3, 4, and 5, respectively. The area 210 outside of the PBS coverage areas may be the coverage area for MBS. The maximum rate scheme associates more users to the MBS because users usually receive the pilot signal with higher SINR from the MBS. As a result of such association, the PBS coverage areas 204, 206 208, 214, and 212 may be relatively small and MBS may be very congested.

Coverage diagram 222 shows circular and partially circular coverage areas 224, 226, 228, 234, and 232 of PBSs 1, 2, 3, 4, and 5, respectively. The area 230 outside of the PBS coverage areas may be the coverage area for MBS. The $\alpha$-optimal distributed scheme may utilize several optimization policies for user-BS associations to balance the flow level traffic among BSs. Considering the load balancing, the α-optimal distributed scheme may offload traffic from the MBS to PBSs to minimize or otherwise reduce the network latency. Therefore, the coverage areas 224, 226, 228, 234, and 232 of PBSs 1, 2, 3, 4, and 5 may increase relative to the maximum rate scheme.

Figure 3:
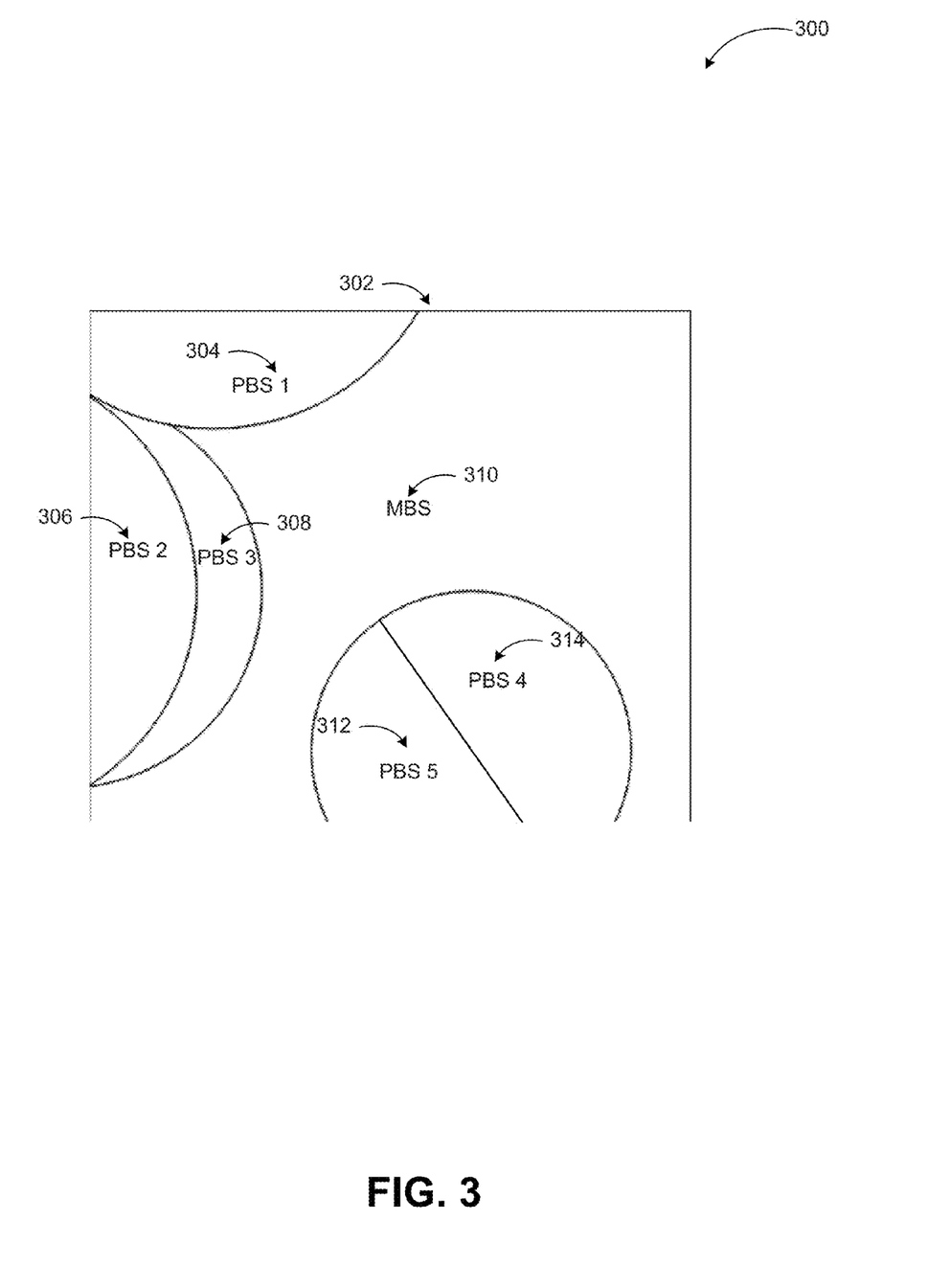
FIG. 3 illustrates an example of a GALA approach used to associate a base station with a communication device.

FIG. 3 illustrates an example of a GALA approach used to associate a base station with a communication device, arranged in accordance with at least some embodiments described herein.

As depicted, a diagram 300 includes coverage diagram 302, which shows circular and partially circular coverage areas 304, 306, 308, 314, and 312 of PBSs 1, 2, 3, 4, and 5, respectively. The area 310 outside of the PBS coverage areas may be the coverage area for MBS. Since PBSs usually consume less power than the MBS, the GALA approach may further offload traffic from the MBS to PBSs to reduce power consumption. During the traffic offloading, GALA approach may increase the utilization of green energy to reduce the on-grid power consumption. Thus, the coverage areas 304, 306, 308, 314, and 312 of PBSs 1, 2, 3, 4, and 5 may be larger compared to both the maximum rate scheme and the α-distributed scheme.

The GALA approach according to some embodiments is a distributed user-association scheme, which includes a user side computation and a BS side computation. Two assumptions may be made to enable the distributed user-BS association scheme to converge. The first assumption may be that the traffic arrival and departure rates are faster relative to the frequency of BSs in advertising their traffic load. The second assumption may be that the green energy generation rate changes slower as compared with the frequency of BSs in advertising their traffic load.

The BS side computation may determine the traffic load in the BS and update the advertising traffic load. Based on the advertised traffic load, the BS's energy-latency coefficient, and the BS's green traffic capacity, the user side algorithm may select a BS to reduce the BS's power consumption. The BSs may broadcast their traffic loads after the system exhibits the stationary performance. Another assumption may be made that all BSs are synchronized and simultaneously advertise their traffic loads. A time interval between two consecutive traffic load advertisements may be defined as a time slot. The energy-latency coefficient may be assumed to be substantially constant and the green energy generation rate may be consistent during the time period of establishing a stable user-BS association.

At the beginning of the kth time slot, BSs may broadcast their traffic load $\rho_j(k)$, energy-latency coefficient $\theta_j$, and the green traffic load $\hat{\rho}_j(k)$ to mobile devices. A function $\phi_j(k)$ may be defined in terms of the BS's parameters as: a time slot may be defined as the time interval between two consecutive traffic advertisements. k is denoted as the index of the time slot. $\phi_j(k)$ is an intermediate value calculated based on the traffic load and green energy status in the jth BS at the kth time slot.

$$\phi_j(k) = \frac{\bar{\rho}_j(k)^2}{(1-\theta_j)\rho_j(k)^2 + \theta_j \rho_j(k)\hat{\rho}_j(k)(2-\rho_j(k))} \quad [7]$$

Then, the user i's BS selection rule may be expressed as:

$$b_i^k(x) = \arg\max_{j \in B} r_j(x)(1-\rho_j(k))^2 \phi_j(k), \quad [8]$$

where $b_i^k(x)$ is the index of the BS selected by user i, $r_j(x)$ is the user's data rate, and $\rho_j(k)$ is the BS's traffic load.

In response to receiving BSs' broadcasting messages including the traffic load, the energy latency coefficient, and the green traffic load, mobile devices may select BSs according to the user side BS selection algorithm. Then, the coverage area of BS j, $\hat{A}_j(k)$, may be updated as:

$$\hat{A}_j(k) = \{ | j = \arg\max_{l \in B} r_{i,l}(x)(1-\rho_l(k))^2 \phi_l(k), \forall x \in A \}. \quad [9]$$

Then, given $\rho(k)=(\rho_1(k), \rho_2(k), \ldots, \rho_{|B|}(k))$, $\theta(k)=(\theta_1(k), \theta_2(k), \ldots, \theta_{|B|}(k))$, and $\hat{\rho}(k)=(\hat{\rho}_1(k), \hat{\rho}_2(k), \ldots, \hat{\rho}_{|B|}(k))$, BS j's perceived traffic load, $M_j$, at the kth time slot maybe expressed as:

$$M_j(\rho(k),\theta(k),\hat{\rho}(k)) = \min(\int_{x \in \hat{A}_j(k)} \tilde{n}_j(x)dx, 1-\hat{o}). \quad [10]$$

Here, $\tilde{n}_j(x)$ is the average traffic load density at location x on BS j, and ò is an arbitrary small positive constant to guarantee $M_j(\rho(k), \theta(k), \hat{\rho}(k)) < 1$. Because the green energy generation rate is assumed to change slower as compared with the frequency of BSs in advertising their traffic load, a further assumption may be made that the green energy generation rate is consistent before the algorithm converges.

The perceived traffic load of BS j may evolve as follows: after BSs have broadcast $\rho(k)$, users may select their associating BSs according to the user side computation; based on the user-BS associations, BSs may compute their perceived traffic load $M_j(\rho(k))$. After having derived the perceived traffic load, BSs may update their next broadcasting messages:

$$\rho(k+1) = \hat{o}\rho(k) + (1-\hat{o})M(\rho(k)). \quad [11]$$

Here, $M(\rho(k)) = (M_1(\rho(k)), M_2(\rho(k)), \ldots, M_{|B|}(\rho(k)))$, and $0 < \hat{o} < 1$ is an exponential averaging parameter. Because both $M(\rho(k))$ and $\rho(k)$ are defined on $[0, 1-\hat{o}]$, $M(\rho(k))$ may be a continuous mapping to itself.

Thus, in response to receiving one or more metrics associated with two or more base stations, a controller (which may be a separate standalone controller, a base station, or even a communication device or any other suitable network device) may analyze a green energy usage status and a latency status of the two or more base stations based on the received metrics. The metrics may include a traffic load, an energy latency coefficient, a green traffic load, and/or similar attributes associated with each base station. The controller may then enable advertisement of the green energy usage status and the latency status of the base stations to a communication device and detect a selection of one of the base stations by the communication device. A coverage area of the selected base station may then be updated based on the selection.

Embodiments may be implemented via hardware, software, and/or combinations of hardware and software components. The software components may operate with communication or signaling systems, to associate a base station with a communication device through a GALA approach in a wireless network, such as a heterogeneous cellular network.

While embodiments have been discussed above using specific examples, components, scenarios, and configurations in FIG. 1, FIG. 2, and FIG. 3 they are intended to provide an illustrative guideline to be used to associate a base station with a communication device through a GALA approach in a wireless network, such as a heterogeneous cellular network. These examples do not constitute a limitation on the embodiments, which may be implemented using other components, optimization/improvement schemes, and configurations using the principles described herein. For instance, other approaches may be implemented than those provided as examples.

Figure 4:
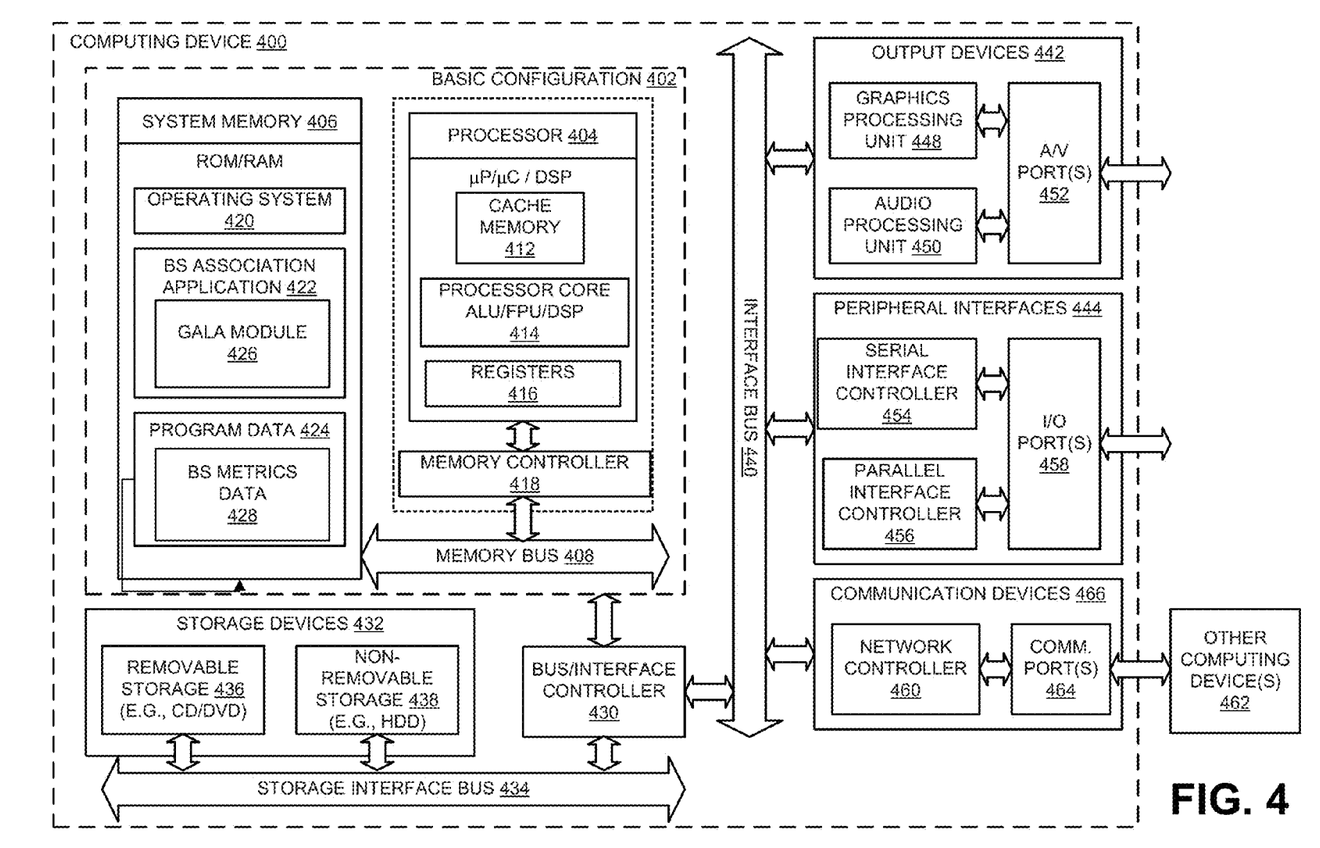
FIG. 4 illustrates a computing device, which may be used to associate a base station with a communication device through a GALA approach in a wireless network, such as a heterogeneous cellular network.

FIG. 4 illustrates a computing device, which may be used to associate a base station with a communication device through a GALA approach in a wireless network, such as a heterogeneous cellular network, arranged in accordance with at least some embodiments described herein. The computing device 400 of FIG. 4 may be a device configured to execute or otherwise provide the features of a GALA module in a wireless network such as the network illustrated in diagram 100. For example, the computing device 400 may be embodied as MBS 102 or a controller associated with the network in FIG. 1. In a very basic configuration 402, computing device 400 typically includes one or more processors 404 and a system memory 406. A memory bus 408 may be used for communicating between processor 404 and system memory 406.

Depending on a particular configuration, processor 404 may be of any type including but not limited to a microprocessor (µP), a microcontroller (µC), a Digital Signal Processor (DSP), or any combination thereof. Processor 404 may include one more levels of caching, such as a cache memory 412, a processor core 414, and registers 416. Example processor core 414 may include an Arithmetic Logic Unit (ALU), a floating point unit (FPU), a Digital Signal Processing core (DSP Core), or any combination thereof. An example memory controller 418 may also be used with processor 404, or in some implementations, memory controller 418 may be an internal part of processor 404.

Depending on the particular configuration, system memory 406 may be of any type including but not limited to volatile memory (such as RAM), non-volatile memory (such as ROM, flash memory, etc.) or any combination thereof. System memory 406 may include an operating system 420, a BS association application 422, and program data 424. The BS association application 422 may include one or more GALA module 426 (which may embody one or more of the previously described GALA operations) that is arranged to associate a base station with a communication device through a GALA approach in a wireless network, such as a heterogeneous cellular network. Program data 424 may include one or more BS metrics data 428 and other data as discussed above in conjunction with at least FIGS. 1, 2, and 3. This data may be useful for association of a base station with a communication device through a GALA approach in a wireless network as is described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 400. Any such computer storage media may be part of computing device 400.

Computing device 400 may also include an interface bus 440 for facilitating communication from various interface devices (for example, output devices 442, peripheral interfaces 444, and communication devices 466) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device or any other suitable electronic device that includes any of the above functions. Computing device 400 may also be implemented as specialized controller, for example part of MBS 102 in FIG. 1 or as a separate controller that is configured to communicate with MBS 102 and other base stations in the network of FIG. 1. As such, some of the components of the computing device 400 may not be included or additional components may be included depending on the implementation of the computing device 400.

Networks for a networked system including computing device 400 may comprise any topology of servers, clients, switches, routers, modems, Internet service providers, cellular service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network (for example, IEEE 802.11 wireless networks), or a world-wide network such (for example, the Internet). The networks may include one or more of an Evolved Universal Mobile Telecommunications System Terrestrial Radio Access Network (eUTRAN), a long term evolution (LTE) network, an LTE-Advanced network, a high speed packet access (HSPA) network, or an advanced HSPA network. The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
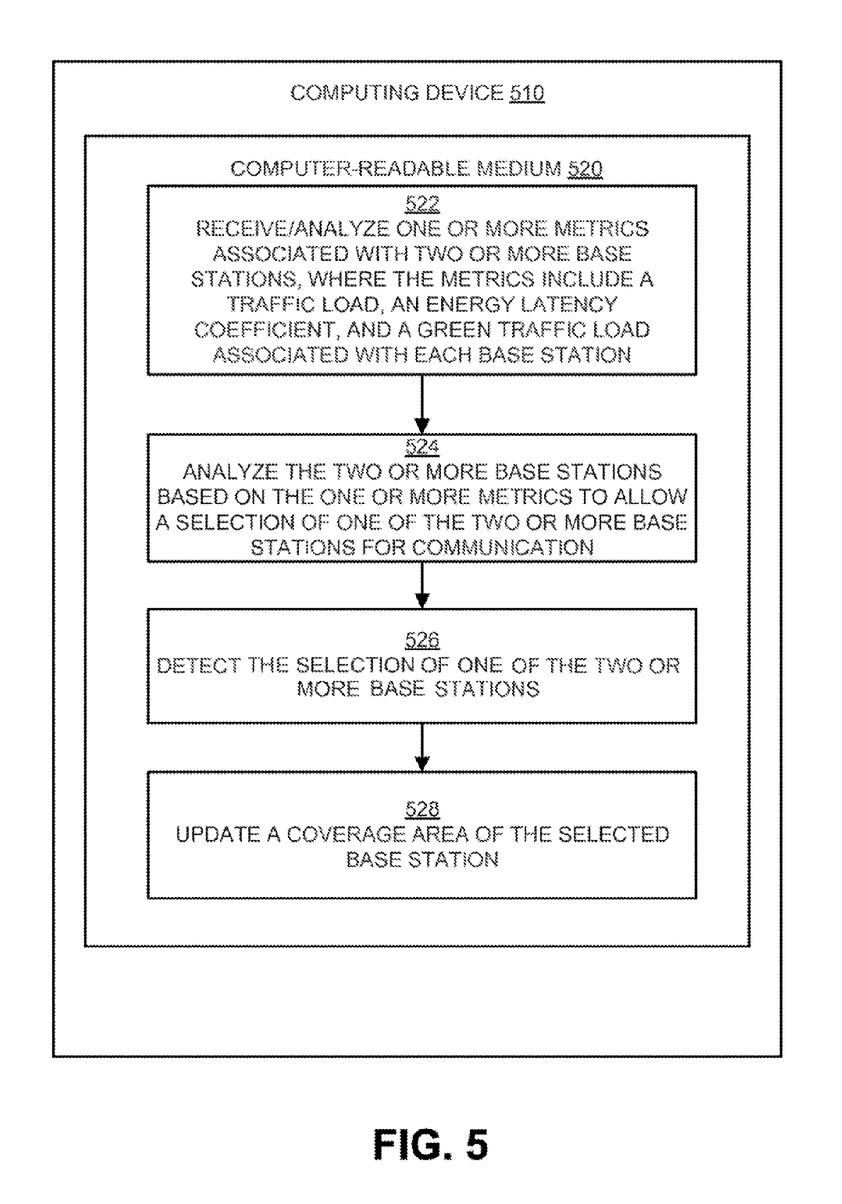
FIG. 5 is a flow diagram illustrating an example method to associate a base station with a communication device through a GALA approach in a wireless network, such as a heterogeneous cellular network.

FIG. 5 is a flow diagram illustrating an example method to associate a base station with a communication device through a GALA approach in a wireless network, such as a heterogeneous cellular network, that may be performed by a computing device 510, such as the computing device 400 in FIG. 4, arranged in accordance with at least some embodiments described herein.

In one embodiment, computing device 510 may be embodied as computing device 400, or similar devices executing instructions stored in a non-transitory computer-readable medium 520 to perform the method. In other embodiments, other techniques or device(s) and component(s) thereof (including hardware) may be used to perform the method. A process to associate a base station with a communication device through a GALA approach in a wireless network, such as a heterogeneous cellular network, may include one or more operations, functions or actions as is illustrated by one or more of blocks 522, 524, 526, and/or 528.

Some example processes may begin with operation 522, "RECEIVE/ANALYZE ONE OR MORE METRICS ASSOCIATED WITH TWO OR MORE BASE STATIONS, WHERE THE METRICS INCLUDE A TRAFFIC LOAD, AN ENERGY LATENCY COEFFICIENT, AND A GREEN TRAFFIC LOAD ASSOCIATED WITH EACH BASE STATION." At operation 522, the computing device 400 may receive metrics such as a traffic load, an energy latency coefficient, and/or a green traffic load associated with base stations from the base stations or another source such as a controller or database of the wireless network. The computing device 400 may analyze the received metrics.

Operation 522 may be followed by operation 524, "ANALYZE THE TWO OR MORE BASE STATIONS BASED ON THE ONE OR MORE METRICS TO ALLOW A SELECTION OF ONE OF THE TWO OR MORE BASE STATIONS FOR COMMUNICATION." At operation 524, the computing device 400 may analyze the base stations based on the received metrics to allow a selection (for example selection by a communication device) of one of the base stations for communication with a communication device such as an end device, a router, or an other device of the wireless network.

Operation 524 may be followed by operation 526, "DETECT THE SELECTION OF ONE OF THE TWO OR MORE BASE STATIONS." At operation 526, the computing device 400 may detect the selection of one of the base stations for communication with the communication device (for example, by the communication device).

Operation 526 may be followed by operation 528, "UPDATE A COVERAGE AREA OF THE SELECTED BASE STATION." At operation 528, the selected base station may update its coverage area.

Figure 6:
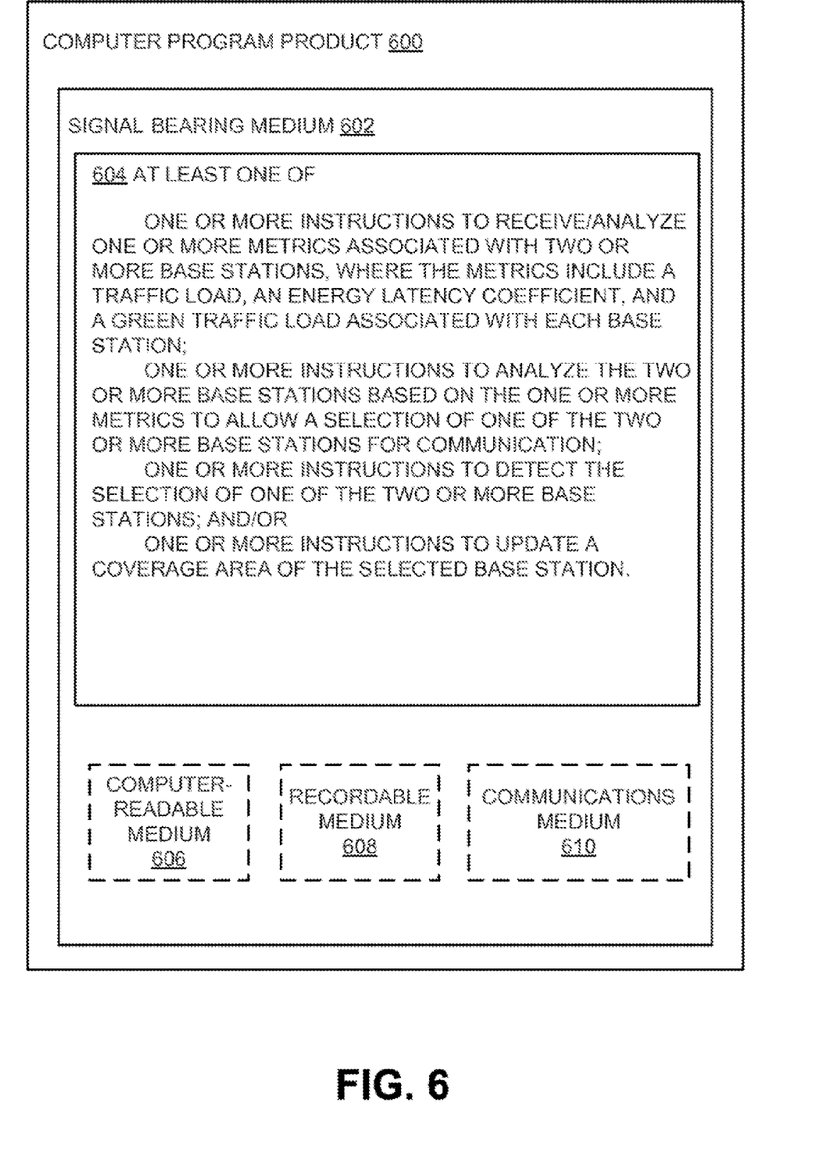
FIG. 6 illustrates a block diagram of an example computer program product to associate a base station with a communication device through a GALA approach in a wireless network, such as a heterogeneous cellular network, all arranged in accordance with at least some embodiments described herein.

FIG. 6 illustrates a block diagram of an example computer program product to associate a base station with a communication device through a GALA approach in a wireless network, such as a heterogeneous cellular network, arranged in accordance with some embodiments herein.

In some examples, as shown in FIG. 6, computer program product 600 may include a signal bearing medium 602 that may also include machine readable instructions 604 that, in response to execution by, for example, a processor, may provide the functionality described above with respect to FIG. 1 through FIG. 5. Thus, for example, referring to computing device 400, one or more of the tasks shown in FIG. 6 may be undertaken in response to instructions 604 conveyed to the computing device 400 by medium 602 to perform actions related to association of a base station with a communication device through a GALA approach in a wireless network, such as a heterogeneous cellular network, as described herein. Some of those instructions may include receiving/analyzing one or more metrics associated with two or more base stations, where the metrics include a traffic load, an energy latency coefficient, and a green traffic load associated with each base station; analyzing the two or more base stations based on the one or more metrics to allow a selection of one of the two or more base stations for communication; detecting the selection of one of the two or more base stations; and/or updating a coverage area of the selected base station.

In some implementations, signal bearing medium 602 depicted in FIG. 6 may encompass a non-transitory computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (for example, a fiber optic cable, a waveguide, a wired communications link, a wireless communication link, etc.). Thus, for example, computer program product 600 may be conveyed to the processor 404 by an RF signal bearing medium 602, where the signal bearing medium 602 is conveyed by a wireless communications medium 610 (for example, a wireless communications medium conforming with the IEEE 802.11 standard).

According to some examples, a method is provided to associate a base station with a communication device through a green energy aware and a latency aware (GALA) approach in a wireless network. The example method may include receiving one or more metrics associated with two or more base stations, where the one or more metrics include a traffic load, an energy latency coefficient, and a green traffic load associated with each base station; analyzing a green energy usage status and a latency status of the two or more base stations based on the one or more metrics; and enabling advertising of the green energy usage status and the latency status of the two or more base stations to the communication device. The method may also include detecting a selection of one of the two or more base stations by the communication device and updating a coverage area of the selected base station based on the selection.

According to other examples, the method may further include one or more of determining a traffic arrival rate associated with each base station to be faster compared to a frequency to advertise the traffic load associated with each base station, prior to analyzing the green energy usage status and the latency status of the two or more base stations; determining a traffic departure rate associated with each station to be faster compared to a frequency to advertise the traffic load associated with each base station, prior to analyzing the green energy usage status and the latency status of the two or more base stations; or determining a green energy generation rate change to be slower compared to a frequency to advertise the traffic load associated with each base station, prior to analyzing the green energy usage status and the latency status of the two or more base stations.

According to further examples, the energy latency coefficient may be substantially constant. Analyzing the green energy usage status and the latency status of the two or more base stations may include computing an index for each base station based on the one or more metrics; ordering the two or more base stations based on the index; and presenting the ordered base stations to the communication device to allow the selection by the communication device. The method may also include determining a perceived traffic load of the selected base station based on an energy consumption of the selected base station.

According to yet other examples, the energy consumption may include an on-grid energy consumption and/or an off-grid energy consumption. The method may also include computing a particular traffic load vector that reduces the green traffic load based on the perceived traffic load and/or converging the perceived traffic load associated with the selected base station based on the particular traffic load vector. Updating the coverage area of the selected base station based on the selection may include updating the coverage area of the selected base station based on the particular traffic load vector.

According to other examples, an apparatus including a communication module and a processor is provided to employ a green energy aware and a latency aware (GALA) approach in a wireless network. The communication module may be configured to communicate with at least two or more base stations. The processor may be configured to analyze one or more metrics associated with the two or more base stations, where the one or more metrics include a traffic load, an energy latency coefficient, and a green traffic load associated with each base station; analyze a green energy usage status and a latency status of the two or more base stations based on the one or more metrics; and control the communication module to advertise the green energy usage status and the latency status of the two or more base stations to a communication device. The processor may be further configured to detect a selection of one of the two or more base stations by the communication device and update a coverage area of the selected base station based on the selection.

According to some embodiments, the processor may be further configured to determine a traffic arrival rate associated with each base station to be faster compared to a frequency of advertisement of the traffic load associated with each base station, prior to analysis of the green energy usage status and the latency status of the two or more base stations; determine a traffic departure rate associated with each base station to be faster compared to a frequency of advertisement of the traffic load associated with each base station, prior to analysis of the green energy usage status and the latency status of the two or more base stations; and/or determine a green energy generation rate change to be slower compared to a frequency of advertisement of the traffic load associated with each base station, prior to analysis of the green energy usage status and the latency status of the two or more base stations, where the energy latency coefficient is substantially constant.

According to further examples, the processor may be further configured to compute an index for each base station based on the one or more metrics, order the two or more base stations based on the index, and control the communication module to present the ordered base stations to the communication device to allow the selection. The processor may also be further configured to determine a perceived traffic load of the selected base station based on an energy consumption of the selected base station, where the energy consumption includes at least one from a set of: an on-grid energy consumption and an off-grid energy consumption. The processor may further compute a particular traffic load vector that reduces the green traffic load based on the perceived traffic load, converge the traffic load associated with the selected base station based on the particular traffic load vector, and update the coverage area of the selected base station based on the particular traffic load vector.

According to yet other examples, the apparatus may be integrated with a base station of the wireless network. The wireless network may be a heterogeneous cellular network. The wireless network may also be a cellular network that is an Evolved Universal Mobile Telecommunications System Terrestrial Radio Access Network (eUTRAN), a long term evolution (LTE) network, an LTE-Advanced network, a high speed packet access (HSPA) network, or an advanced HSPA network. The communication device may be an end device.

According to further examples, a system that includes two or more base stations and a controller is provided. The controller may associate one of the two or more base stations with one of a plurality of communication devices through a green energy aware and a latency aware (GALA) approach. The controller may be configured to analyze a green energy usage status and a latency status of the two or more base stations based on one or more metrics associated with the two or more base stations, where the one or more metrics include a traffic load, an energy latency coefficient, and a green traffic load associated with each base station; compute an index for each base station based on the analysis; and order the two or more base stations based on the index. The controller may also be configured to enable advertisement of the ordered base stations to the plurality of communication devices and detect a selection of one of the ordered base stations by the one of the plurality of communication devices.

According to other examples, the controller may be further configured to prior to analysis of the green energy usage status and the latency status of the two or more base stations, determine one or more of a traffic arrival rate associated with each base station to be faster compared to a frequency of advertisement of the traffic load associated with each base station, a traffic departure rate associated with each base station to be faster compared to a frequency of advertisement of the traffic load associated with each base station, and a green energy generation rate change to be slower compared to a frequency of advertisement of the traffic load associated with each base station. The energy latency coefficient may be substantially constant.

According to some examples, the controller may be further configured to determine a perceived traffic load of the selected base station based on an energy consumption of the selected base station, where the energy consumption includes at least one from a set of: an on-grid energy consumption and an off-grid energy consumption; compute a particular traffic load vector that reduces the green traffic load based on the perceived traffic load; converge the traffic load associated with the selected base station based on the particular traffic load vector; and update a coverage area of the selected base station based on the particular traffic load vector. The controller may be integrated in one of the two or more base stations.

According to some examples, a computer-readable non-transitory storage medium with instructions stored thereon to associate a base station with a communication device through a green energy aware and a latency aware (GALA) approach in a wireless communication network is provided. The instructions, in response to execution by a processor, may cause the method as described herein to be performed.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more"

or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to associate a base station with a communication device through a green energy aware and a latency aware (GALA) approach in a wireless network, the method comprising:
   receiving one or more metrics associated with two or more base stations, wherein the one or more metrics include a traffic load, an energy latency coefficient, and a green traffic load associated with each base station;
   determining one or more of a traffic arrival rate and a traffic departure rate associated with each base station, wherein the traffic arrival and departure rates are faster than a frequency at which each base station advertises its traffic load;
   analyzing a green energy usage status and a latency status of the two or more base stations based on the one or more metrics;
   enabling advertising of the green energy usage status and the latency status of the two or more base stations to the communication device;
   detecting a selection of one of the two or more base stations by the communication device; and
   updating a coverage area of the selected base station based on the selection.

2. The method of claim 1, further comprising:
   determining a green energy generation rate change to be slower compared to a frequency to advertise the traffic load associated with each base station, prior to analyzing the green energy usage status and the latency status of the two or more base stations.

3. The method of claim 1, wherein the energy latency coefficient is substantially constant.

4. The method of claim 1, wherein analyzing the green energy usage status and the latency status of the two or more base stations comprises:
   computing an index for each base station based on the one or more metrics;
   ordering the two or more base stations based on the index; and
   presenting the ordered base stations to the communication device to allow the selection by the communication device.

5. The method of claim 1, further comprising:
   determining a perceived traffic load of the selected base station based on an energy consumption of the selected base station.

6. The method of claim 5, wherein the energy consumption includes at least one from a set of: an on-grid energy consumption and an off-grid energy consumption.

7. The method of claim 5, further comprising:
   computing a particular traffic load vector that reduces the green traffic load based on the perceived traffic load.

8. The method of claim 7, further comprising:
   converging the perceived traffic load associated with the selected base station based on the particular traffic load vector.

9. The method of claim 8, wherein updating the coverage area of the selected base station based on the selection includes:
   updating the coverage area of the selected base station based on the particular traffic load vector.

10. A computer-readable non-transitory storage medium with instructions stored thereon to associate a base station with a communication device through a green energy aware and a latency aware (GALA) approach in a wireless communication network, wherein the instructions, in response to execution by a processor, cause the method of claim 1 to be performed.

11. An apparatus to employ a green energy aware and a latency aware (GALA) approach in a wireless network, the apparatus comprising:
   a communication module configured to communicate with at least two or more base stations,
   a processor coupled to the communication module, wherein the processor is configured to:
      analyze one or more metrics associated with the two or more base stations, wherein the one or more metrics include a traffic load, an energy latency coefficient, and a green traffic load associated with each base station;
      determine one or more of a traffic arrival rate and a traffic departure rate associated with each base station, wherein the traffic arrival and departure rates are faster than a frequency at which each base station advertises its traffic load;

analyze a green energy usage status and a latency status of the two or more base stations based on the one or more metrics;

control the communication module to advertise the green energy usage status and the latency status of the two or more base stations to a communication device;

detect a selection of one of the two or more base stations by the communication device; and update a coverage area of the selected base station based on the selection.

12. The apparatus according to claim 11, wherein the processor is further configured to:

determine a green energy generation rate change to be slower compared to a frequency of advertisement of the traffic load associated with each base station, prior to analysis of the green energy usage status and the latency status of the two or more base stations, wherein the energy latency coefficient is substantially constant.

13. The apparatus according to claim 11, wherein the processor is further configured to:

compute an index for each base station based on the one or more metrics;

order the two or more base stations based on the index; and control the communication module to present the ordered base stations to the communication device to allow the selection.

14. The apparatus according to claim 11, wherein the processor is further configured to:

determine a perceived traffic load of the selected base station based on an energy consumption of the selected base station, wherein the energy consumption includes at least one from a set of: an on-grid energy consumption and an off-grid energy consumption.

15. The apparatus according to claim 14, wherein the processor is further configured to:

compute a particular traffic load vector that reduces the green traffic load based on the perceived traffic load;

converge the traffic load associated with the selected base station based on the particular traffic load vector; and update the coverage area of the selected base station based on the particular traffic load vector.

16. The apparatus according to claim 11, wherein the apparatus is integrated with a base station of the wireless network.

17. The apparatus according to claim 11, wherein the wireless network comprises a heterogeneous cellular network.

18. The apparatus according to claim 11, wherein the wireless network comprises a cellular network that is one of an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

19. The apparatus according to claim 11, wherein the communication device includes an end device.

20. A system comprising:

two or more base stations;

a controller to associate one of the two or more base stations with one of a plurality of communication devices through a green energy aware and a latency aware (GALA) approach, wherein the controller is configured to:

determine one or more of a traffic arrival rate and a traffic departure rate associated with each base station, wherein the traffic arrival and departure rates are faster than a frequency at which each base station advertises its traffic load;

analyze a green energy usage status and a latency status of the two or more base stations based on one or more metrics associated with the two or more base stations, wherein the one or more metrics include the traffic load, an energy latency coefficient, and a green traffic load associated with each base station;

compute an index for each base station based on the analysis;

order the two or more base stations based on the index;

enable advertisement of the ordered base stations to the plurality of communication devices; and detect a selection of one of the ordered base stations by the one of the plurality of communication devices.

21. The system according to claim 20, wherein the controller is further configured to:

prior to analysis of the green energy usage status and the latency status of the two or more base stations, further determine:

a green energy generation rate change to be slower compared to a frequency of advertisement of the traffic load associated with each base station.

22. The system according to claim 20, wherein the energy latency coefficient is substantially constant.

23. The system according to claim 20, wherein the controller is further configured to:

determine a perceived traffic load of the selected base station based on an energy consumption of the selected base station, wherein the energy consumption includes at least one from a set of: an on-grid energy consumption and an off-grid energy consumption;

compute a particular traffic load vector that reduces the green traffic load based on the perceived traffic load;

converge the traffic load associated with the selected base station based on the particular traffic load vector; and update a coverage area of the selected base station based on the particular traffic load vector.

24. The system according to claim 20, wherein the controller is integrated in one of the two or more base stations.

* * * * *